(12) United States Patent
Yumoto et al.

(10) Patent No.: US 10,872,606 B2
(45) Date of Patent: Dec. 22, 2020

(54) DEVICE CONTROL APPARATUS AND DEVICE CONTROL METHOD

(71) Applicant: OLYMPUS CORPORATION, Hachioji (JP)

(72) Inventors: Kenta Yumoto, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 255 days.

(21) Appl. No.: 16/041,248

(22) Filed: Jul. 20, 2018

(65) Prior Publication Data

US 2019/0035395 A1    Jan. 31, 2019

(30) Foreign Application Priority Data

Jul. 31, 2017    (JP) ................................ 2017-147917

(51) Int. Cl.
*G10L 15/22* (2006.01)
*G06F 3/16* (2006.01)
*G10L 15/26* (2006.01)
*G06Q 10/10* (2012.01)

(52) U.S. Cl.
CPC ............. *G10L 15/22* (2013.01); *G06F 3/167* (2013.01); *G10L 15/26* (2013.01); *G06Q 10/103* (2013.01); *G10L 2015/223* (2013.01)

(58) Field of Classification Search
None
See application file for complete search history.

(56) References Cited

U.S. PATENT DOCUMENTS

| 8,620,667 | B2 * | 12/2013 | Andrew | G10L 15/19 704/275 |
|---|---|---|---|---|
| 2007/0288242 | A1 * | 12/2007 | Spengler | G10L 15/20 704/275 |
| 2011/0006876 | A1 * | 1/2011 | Moberg | A61M 5/16831 340/3.2 |
| 2011/0301943 | A1 * | 12/2011 | Patch | G10L 15/26 704/9 |
| 2014/0136187 | A1 * | 5/2014 | Wolverton | G10L 15/22 704/9 |
| 2014/0272888 | A1 * | 9/2014 | Waxman | G09B 5/02 434/350 |
| 2015/0106868 | A1 * | 4/2015 | Lo | G06F 21/32 726/1 |

(Continued)

FOREIGN PATENT DOCUMENTS

JP        2016057461 A    4/2016

*Primary Examiner* — Neeraj Sharma
(74) *Attorney, Agent, or Firm* — Volpe Koenig

(57) ABSTRACT

A device control apparatus controls an operation device. A plurality of persons is engaged in operations of the operation device. The device control apparatus comprises a control circuit configured to obtain voice instructions or voice responses from the plurality of persons, the voice instructions or voice responses including modalities of operations of the operation device, classify the modalities included in the voice instructions or voice responses, and determine a preferential operation of the operation device according to consistency between a first modalities classified from the voice instructions or a second modalities classified from the voice responses and priorities predefined for each person of the plurality of persons.

9 Claims, 11 Drawing Sheets

(56) References Cited

U.S. PATENT DOCUMENTS

| | | | |
|---|---|---|---|
| 2015/0254058 A1* | 9/2015 | Klein | G06F 3/167 |
| | | | 704/275 |
| 2015/0279366 A1* | 10/2015 | Krestnikov | G10L 15/22 |
| | | | 704/235 |
| 2017/0242657 A1* | 8/2017 | Jarvis | G06F 3/165 |
| 2018/0286391 A1* | 10/2018 | Carey | G10L 15/30 |
| 2018/0358000 A1* | 12/2018 | Amid | G06N 20/00 |

* cited by examiner

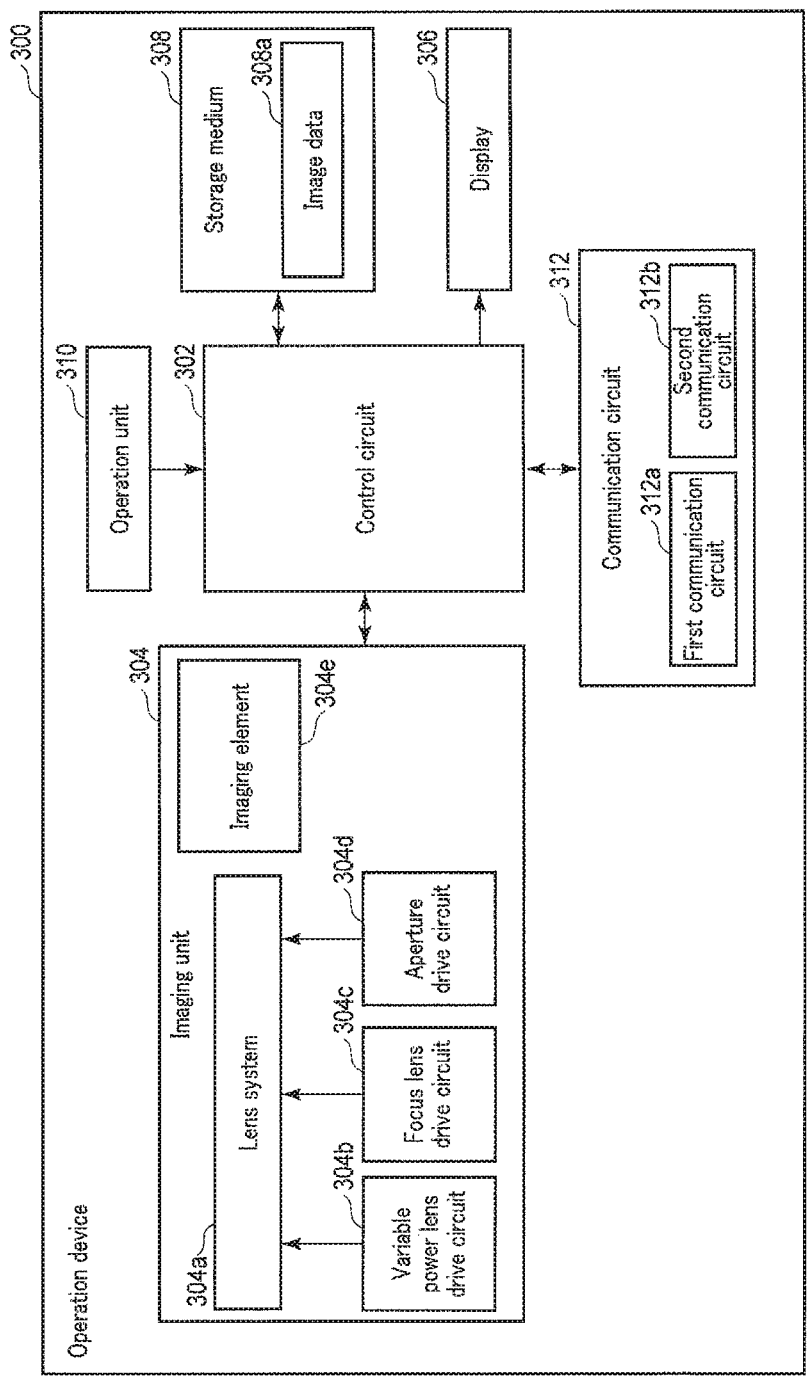
F I G. 4

| | Priority |
|---|---|
| Director | 10 |
| Producer | 5 |
| Cameraman | 3 |

|  | Zoom priority | Focus priority |
| --- | --- | --- |
| Director | 10 | 5 |
| Producer | 5 | 10 |
| Cameraman | 3 | 3 |

FIG. 7

| | Situational priority 1 | Situational priority 2 |
|---|---|---|
| Operator | 8 | 7 |
| Instructor A | 10 | 5 |
| Instructor B | 5 | 10 |

DEVICE CONTROL APPARATUS AND DEVICE CONTROL METHOD

CROSS-REFERENCE TO RELATED APPLICATIONS

This application is based upon and claims the benefit of priority from prior Japanese Patent Application No. 2017-147917, filed Jul. 31, 2017, the entire contents of which are incorporated herein by reference.

BACKGROUND OF THE INVENTION

1. Field of the Invention

The present invention relates to a device control apparatus and a device control method for controlling actions by a device.

2. Description of the Related Art

In recent years, voice recognition technologies for device action control have been suggested. Amongst them are voice recognition technologies recognizing speech parts of each speaker of a plurality of speakers from recorded audio signals of the dialogues by the speakers. JP Pat. Appln. KOKAI Publication No. 2016-57461, for example, describes a speaker indexing device that models distributions of a plurality of sets of first feature quantities extracted in every frame of the audio signal by a mixed distribution that includes the same amount of probability distributions as the number of speakers. This speaker indexing device then selects, based on the probability distribution, a set of first feature quantities, selects a second feature quantity for each frame corresponding to the selected set of first feature quantities as learning data corresponding to the probability distribution, and then learns, based on the selected learning data, speaker models.

When devices capable of controlling according to speaker voices deal with teamwork tasks amalgamating the knowledge of different people, the devices are susceptible to noises or unwanted voices occurring as a result of the orientation of the voices. It can thus happen that such device performs actions deviating from the team's intentions. When, for example, multiple voice instructions relating to operations are provided, increased considerations to consistency of the relations between voices from the plurality of persons and device controls are necessary to determine which of the operation contents to prioritize.

BRIEF SUMMARY OF THE INVENTION

According to a first aspect of the invention, a device control apparatus controls an operation device. A plurality of persons is engaged in operations of the operation device. The device control apparatus comprises a control circuit configured to obtain voice instructions or voice responses from the plurality of persons, the voice instructions or voice responses including modalities of operations of the operation device, classify the modalities included in the voice instructions or voice responses, and determine a preferential operation of the operation device according to consistency between a first modalities classified from the voice instructions or a second modalities classified from the voice responses and priorities predefined for each person of the plurality of persons.

According to a second aspect of the invention, a device control method is for controlling an operation device. A plurality of persons is engaged in operations of the operation device. The device control method comprises: obtaining, at a control circuit, instructions or voice responses from the plurality of persons, the voice instructions or voice responses including modalities of operations of the operation device, classify, at the control circuit, the modalities included in the voice instructions or voice responses, and determining, at the control circuit, a preferential operation of the operation device according to consistency between a first modalities classified from the voice instructions or a second modalities classified from the voice responses and priorities predefined for each person of the plurality of persons.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 shows an example configuration of an operation device.

FIG. 7 shows a modification of the priority database.

DETAILED DESCRIPTION OF THE INVENTION

The following shall explain the embodiments of the present invention with reference to the drawings.

First Embodiment

Figure 1:
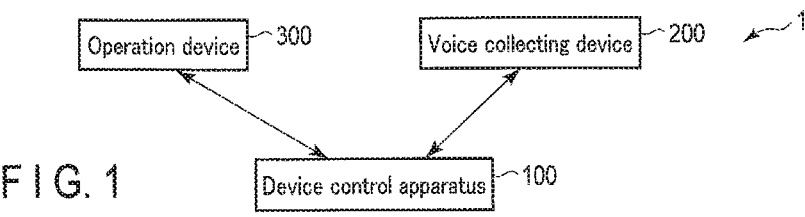
FIG. 1 shows an example configuration of a device control system including a device control apparatus according to the embodiments of the present invention.

FIG. 1 shows an example configuration of the device control system, comprising a device control apparatus according to the embodiment. The device control system 1 shown in FIG. 1 comprises a device control apparatus 100, a voice collecting device 200 and an operation device 300. The device control apparatus 100 and the voice collecting device 200 are communicably connected. Similarly, the device control apparatus 100 and the operation device 300 are communicably connected. The voice collecting device 200 and the operation device 300 may or may not be communicably connected. The device control apparatus 100 and the voice collecting device 200 shown in FIG. 1 are provided separately from the operation device 300. However, one device may be provided within another. As an example, the device control apparatus 100 and the voice collecting device 200 may be provided within the operation device 300. As another example, the device control apparatus 100 may be provided within the voice collecting device 200.

The device control apparatus 100 is, for example, a computer comprising a CPU, and it controls the operations of the operation device 300 performed directly by an operator. As an example, the device control apparatus 100 recognizes contents of voices obtained by the voice collecting device 200, and, according to the results of this recognition, grants or restricts operations of the operation device 300 by the operator. When voices obtained by the voice collecting device 200 include those of a plurality of instructors of which none is operator, or when contents of operations of the operation device 300 by the operator are different from contents of operations instructed by the instructor, the device control apparatus 100 determines a content of a preferential operation of the operation device 300 according to pre-defined priorities. This technique is not only useful when instructions contradict one another, but also when instructions and responses contradict one another, which is why the device control apparatus 100 may comprise an operation controller determining operations of the operation device according to consistency (degree of consistency) between instruction contents and response contents. For this purpose, a priority database or a relationship database is established for the speech background of each person, such as their strength of opinion, knowledge, experience, expertise, or their role in the specific scene to perform a control that effectively links speeches to operations in accordance with the given situation and help attain the object of the device or apparatus in the various situations. Needless to say that aforementioned contradiction and consistency or discordance in the responses may be broadened from those between instruction and another instruction to those between instruction and response.

The voice collecting device 200 comprises a voice collecting instrument (e.g. microphone) converting external voice inputs into electric signals, which it then converts into digital data which it stores. The voice collecting device 200 further transmits the digital audio signals (voice data) to the device control apparatus 100.

The operation device 300 is operated by an operator, and acts according to operations by the operator. When there are control instructions from the device control apparatus 100, the operation device 300 acts according to the contents of the control instructions.

Figure 2:
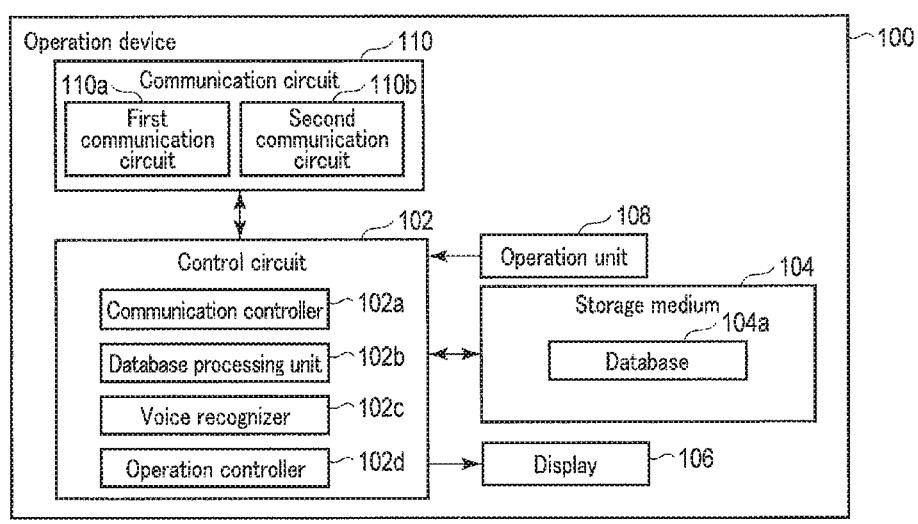
FIG. 2 shows an example configuration of the device control apparatus.

FIG. 2 shows an example configuration of the device control apparatus 100. The device control apparatus 100 shown in FIG. 2 comprises a control circuit 102, a storage medium 104, a display 106, an operation unit 108, and a communication circuit 110.

The control circuit 102 is constituted of hardware such as a CPU. The control circuit 102 controls the actions by the device control apparatus 100. The control circuit 102 includes a communication controller 102a, a database processing unit 102b, a voice recognizer 102c, and of an operation controller 102d. The communication controller 102a controls communication at the communication circuit 110. The database processing unit 102b performs processes relating to a database 104a stored in the storage medium 104, such as updating the database 104a. The voice recognizer 102c recognizes, with reference to the database 104a stored in the storage medium 104, voice contents indicated by the voice data transmitted from the voice collecting device 200 via the communication circuit 110. The operation controller 102d provides, according to the results of the recognition performed by the voice recognizer 102c, instructions for controlling processes that correspond to operations of the operation device 300 by the operator. Note that the functions as communication controller 102a, database processing unit 102b, voice recognizer 102c, and operation controller 102d are realized using, for example, software. Of course, the functions may also be realized using hardware. The functions may even be realized by distributed processing using cloud computing.

The storage medium 104 is, for example, a Hard Disc Drive (HDD) or a Solid State Drive (SSD). Stored in the storage medium 104 are different programs executable at the control circuit 102. Further stored in the storage medium 104 is the database 104a for voice recognition by the control circuit 102. The database 104a comprises a voice database and a priority database. The voice database stores corresponding relations between letters or words and voice data. The priority database stores priorities of operations (instructions) by each person (operator and instructors) engaged in operations of the operation device 300. The priority database shall be described in greater detail further below. The database 104a in the storage medium 104 in the example of FIG. 2 is provided in the device control apparatus 100. However, the database 104a may also be provided somewhere other than in the device control apparatus 100. In this case, the device control apparatus 100 obtains information from the database 104a via network.

The display 106 is, for example, an LCD monitor, displaying the different images. As an example, the display 106 displays images transmitted from the operation device 300.

The operation unit 108 comprises operation elements for manual operation of the device control apparatus 100. These operation elements include buttons, switches, touch panel etc.

The communication circuit 110 enables the communicate device control apparatus 100 to communicate with other devices; it comprises a first communication circuit 110a and a second communication circuit 110b. The first communication circuit 110a performs relatively high-speed, high-capacity communication. The first communication circuit 110a is intended for, for example, Wi-Fi communication. Compared to the first communication circuit 110a, the second communication circuit 110b performs relatively low-capacity, low power-consuming communication. The second communication circuit 110b is intended for, for example, Bluetooth communication. The example wireless communication circuits here are the first communication circuit 110a and the second communication circuit 110b. However, the first communication circuit 110a and/or the second communication circuit 110b may also be cable communication circuits.

Figure 3:
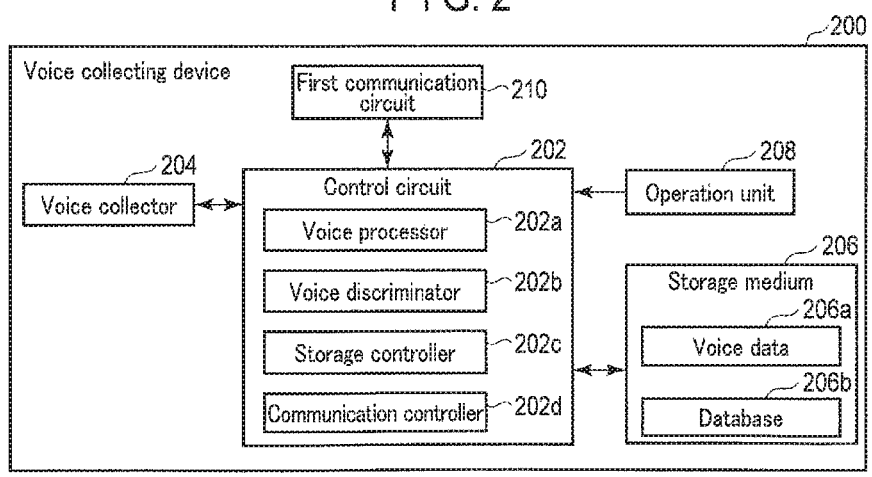
FIG. 3 shows an example configuration of a voice collecting device.

FIG. 3 shows an example configuration of the voice collecting device 200. The voice collecting device 200 shown in FIG. 3 comprises a control circuit 202, a voice collector 204, a storage medium 206, an operation unit 208, and a first communication circuit 210.

The control circuit 202 is constituted of hardware such as a CPU. The control circuit 202 controls the actions by the voice collecting device 200. The control circuit 202 includes a voice processor 202a, a voice discriminator 202b, a storage controller 202c, and a communication controller 202d. The voice processor 202a performs different kinds of processes unto the voice data obtained by the voice collector 204. These processes include such as elimination of the noise from the voice data and compression for storage. The voice discriminator 202b discriminates the voice data for each speaker by cross-checking the voice data processed by the voice processor 202a against the database 206b stored in the storage medium 206. The storage controller 202c stores the compressed voice data to the storage medium 206. The communication controller 202d controls communication at the first communication circuit 210.

The voice collector 204 comprises a voice collecting instrument such as a microphone (mic), and converts external voice inputs into electric signals (audio signals). The voice collector 204 then performs the pre-process of amplifying the audio signals and digitalizing them into voice data. To detect who said what, the voice collector may be configured to assign a separate mic to each person, to match the relations between the positions of the persons and the orientations of the mics, or to discriminate the voiceprints or the voice features. The voice collector is intended for detecting voice instructions or voice responses. However, instead of using the voice collector, instructions or responses may also be detected using sensors or switches such as on a keyboard.

The storage medium 206 is, for example, a flash memory. Stored in the storage medium 206 are different programs executed by the control circuit 202. Further stored in the storage medium 206 is the voice data 206a processed by the voice processor 202a in the control circuit 202. Even further stored in the storage medium 206 is the database 206b for voice discrimination at the control circuit 202. This database 206b comprises a feature database. The feature database stores voice features (frequency characteristics etc.) for each speaker. The database 206b in the storage medium 206 in the example of FIG. 2 is provided in the voice collecting device 200. However, the database 206b may also be provided somewhere other than in the voice collecting device 200. In this case, the voice collecting device 200 obtains information from the database 206b via network.

The operation unit 208 comprises operation elements for manual operation of the voice collecting device 200. These operation elements include buttons, switches, touch panel etc.

The first communication circuit 210 corresponds to the first communication circuit 110a, and performs relatively high-speed, high-capacity communication. The first communication circuit 210 is intended for, for example, Wi-Fi communication.

FIG. 4 shows an example configuration of the operation device 300. The operation device 300 is, for example, a digital camera. In this case, the operation device 300 shown in FIG. 4 comprises a control circuit 302, an imaging unit 304, a display 306, a storage medium 308, an operation unit 310, and a communication circuit 312. The operation device 300 may be any operator-operable device communicable with the device control apparatus 100. The operation device 300 may, for example, be a voice recording apparatus (voice recorder etc.) without the imaging unit 304.

The control circuit 302 is constituted of hardware such as a CPU. The control circuit 302 controls the actions by the operation device 300. The functions executed by the control circuit 302 are executed using, for example, software. Obviously, the functions may also be executed using hardware.

The imaging unit 304 takes images of the subject of the photo shooting to generate image data. The imaging unit 304 comprises a lens system 304a, a variable power lens drive circuit 304b, a focus lens drive circuit 304c, an aperture drive circuit 304d, and an imaging element 304e. The lens system 304a images the light flux from the subject of the photo shooting (not shown in the drawings) onto an acceptance surface of the imaging element 304e. The lens system 304a comprises a zoom lens, a focus lens, and an aperture. The zoom lens is configured to drive in the direction of the light axis and vary the power of the lens system 304a. The focus lens is configured to drive in the direction of the light axis and adjust the focus of the lens system 304a. The aperture is configured to open and close and limit the amount of light flux irradiating from the lens system 304a onto the imaging element 304e. The variable power lens drive circuit 304b comprises a motor or the like to drive the zoom lens according to instructions from the control circuit 302. The focus lens drive circuit 304c comprises a motor or the like to drive the focus lens according to instructions from the control circuit 302. The aperture drive circuit 304d comprises a motor or the like to drive the aperture according to instructions from the control circuit 302. The imaging element 304e is, for example, a CMOS sensor; it converts the light flux received at the acceptance surface into electric signals (image signals). The imaging element 304e performs the pre-process of amplifying the image signals and digitalizing them into image data.

The display 306 is, for example, a LCD monitor, displaying the different images such as those based on the image data obtained by the imaging element 304e.

The storage medium 308 is, for example, a flash memory. Stored in the storage medium 308 are the different programs executable at the control circuit 302. Further stored in the storage medium 308 is the image data 308a processed at the control circuit 302.

The operation unit 310 comprises operation elements for manual operation of the operation device 300. These operation elements include buttons, switches, touch panel etc.

The communication circuit 312 comprises a first communication circuit 312a and a second communication circuit 312b. The first communication circuit 312a corresponds to the first communication circuit 110a, and performs relatively high-speed, high-capacity communication. The first communication circuit 312a is intended for, for example, Wi-Fi communication. The second communication circuit 312b corresponds to the second communication circuit 110b, and performs relatively low-capacity, low power-consuming communication. The second communication circuit 312b is intended for, for example, Bluetooth communication.

Figures 5, 6:
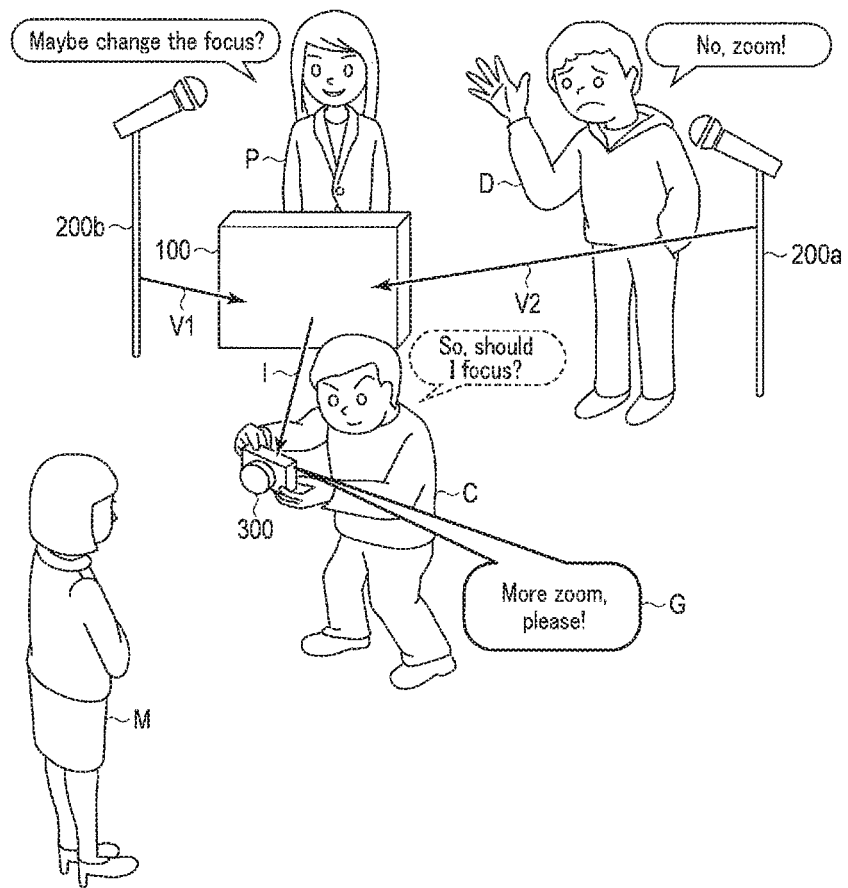
FIG. 5 shows a general outline of the actions by the device control system according to a first embodiment.
FIG. 6 shows an example priority database according to the first embodiment.

The following shall explain the actions by the device control system according to the present embodiments. FIG. 5 shows a general outline of the actions by the device control system 1 according to the first embodiment. FIG. 5 is an example device control system 1 employed at a model shooting scene. Specifically, the camera man C in the example shown in FIG. 5 is holding a digital camera being the operation device 300, with which he takes images of the model M. Behind the camera man C are the director D and the producer P. The director D and the producer P are checking the images taken by the digital camera at the display 106 in the device control apparatus 100, and then providing, as necessary, voice instructions. The voices are gathered at the voice collecting device 200 and transmitted to the device control apparatus 100. The voice collecting devices 200 shown in FIG. 5 are the voice collecting devices 200a and 200b. Accordingly, in the embodiment, a plurality of persons is engaged in actions by the operation device 300. This is to say that the camera man C in the example shown in FIG. 5 is the one who is actually operating the operation device 300, while the director D and the producer P are the ones providing instructions relating to actions by the operation device 300 to the camera man C without the director D and the producer P directly operating the operation device 300. In other words, the instructors are operating the operation device 300 indirectly.

The example of FIG. 5 shows two instructors. Thus, instructions by two instructors may differ from each other. The producer P in the example of FIG. 5 is instructing that the focus be changed, while the director D is instructing that the zoom be changed. In this case, the camera man C has to determine which of the instructions to prioritize, and operate as necessary. The device control apparatus 100 is providing assistance for this determination.

As earlier described, the device control apparatus 100 comprises a priority database. FIG. 6 shows an example priority database according to the first embodiment. In the priority database shown in FIG. 6, the names of the persons engaged in actions by the operation device 300 are matched with priorities assigned to each of the names. In the example of FIG. 5, the persons engaged in actions by the operation device 300 are the camera man C, the director D, and the producer P. The names of the persons engaged in actions by the operation device 300 may be IDs. The priorities are, for example, a least value 1 and a greatest value 10, set for the operations of the relevant scene, based on the expertise or experience of that person or that person's standpoint (e.g. position, given role, status, strength of his opinion etc.). As an example, the director D in FIG. 5 should have both much expertise and high status. Thus, as shown in FIG. 6, the director D is assigned a high priority. In the same way, the producer P and the camera man C are assigned priorities. Note that the priorities stored in the priority database may also be set by forming consensus between the persons engaged in the actions by the operation device 300. Note further that the priorities set by forming consensus or the expertise, standpoint (includes status, strength of opinion etc.), role etc. of the operator and instructors may also be determined by the device control apparatus 100. In this case, the device control apparatus 100 comprises a relation determining unit for determining the relations between the instructions by a plurality of persons and the operations (jobs) for which the instructions are received. Priorities may simply be determined by being set higher the longer or the more often the job has been performed in each role. Priorities may also be determined by the roles stated in the documents left as evidence of who did what. Priorities may even be determined holistically by determining how long or often jobs have been performed and the roles stated in the documents. Priorities may be set low for persons who, for each specific job, often received remarks or instructions that the job should be done over (miss remarks or instructions of failure). Even emotions or the like may be taken into account from the characteristics of the vocal frequencies, and the pitch or loudness, so as to elevate priorities of voices conveying a sense of urgency. Contents of brief, low-voice instructions are sometimes important. For persons who always speak this way, making determinations solely in the described manner is not advised. Determinations may thus also be based on the extent that the characteristics vary. By the holistic learning approach of these matters, configurations are possible where contents in the priority database are successively updated. This learning is relatively easy and allows for feedback that the desired results were attained whenever relations between instructions and operations by each person were observed and so successfully conveyed that operations and controls were indeed conducted without do-overs. For persons for whom this is often not the case, priorities for instructions relating to jobs or operations may be lowered. The embodiment is thus only ineffective where an instruction contradicts another instruction. Where instructions, responses and operations contradict one another, the embodiment is, of course, effective. Where non-contradicting speeches are made, it can be said that they actively contribute towards control performance, which is why a substitute operation controller may be adopted, determining operations of the operation device according to degree of consistency (consistency) between instruction contents and response contents. For this purpose, as earlier mentioned, a priority database or a relationship database for the speech background of each person is established, such as their strength of opinion, knowledge, experience, expertise, or their role in the specific scene to perform a control that effective links speeches to operations according to the given situation and attain the object of the device or apparatus in the various situations. If the priority data base is configured such that not only the standpoint of each person is determined in advance based on the corresponding mic, voice quality, voiceprint etc., but also the standpoint and role are determined based on the person handling the device, the position of the person etc., presetting becomes redundant. Once such a determination is made, voice quality, voiceprint etc. may be used for supplementary determination.

In a scenario where the priority database shown in FIG. 6 is stored in the database 104a of the device control apparatus 100, and the producer P provides instructions that the focus be changed, while the director D provides instructions that the zoom be changed, as shown in FIG. 5, the voice collecting devices 200a, 200b collect voices V1, V2 including the instructions. At the voice collecting device 200a, the voice data of the director D is discriminated from the obtained voice data. Similarly, at the voice collecting device 200b, the voice data of the producer P is discriminated from the obtained voice data. Both instances of voice data are transmitted to the device control apparatus 100.

From differences in contents of instructions recognized from voice data of the producer P and contents of instructions recognized from voice data of the director D, the device control apparatus 100 determines which of the instructions to prioritize with reference to the priority database. Since it is determined from the priority database shown in FIG. 6 that the instructions by the director D be prioritized, the device control apparatus 100 transmits to the operation device 300 control instructions I that the zoom be changed. After receiving the transmission, the operation device 300 acts as guidance prompting the camera man C that the zoom be changed. Guidance G is performed by, for example, the message "more zoom, please!" displayed at the display 306 of the operation device 300. After the camera man C viewed the guidance G, he operates the operation device 300 to change the zoom. The camera man C can thereby operate the operation device 300 appropriately. If the camera man C in the embodiment intends to perform other, for example, focus operations, while guidance G is displayed, focus operations are disabled. It is thus possible, whenever different instructions or operations are competing, to operate the operation device 300 according to instructions by the person with the highest priority considering his expertise etc.

Priorities here are assigned to each individual engaged in operations of the operation device 300, and additionally, for each content of operations of the operation device 300. The priority database shown in FIG. 7 may thus be used. In the priority database shown in FIG. 7, the names (or IDs) of the persons engaged in operations of the operation device 300, the operation contents (e.g. zoom operations, focus operations), and the priorities assigned for each of the operation contents are matched with one another. The persons engaged in operations of the operation device 300 in the example of FIG. 7 are the camera man C, the director D, and the producer P. The names of the persons engaged in the operations of the operation device 300 may be IDs. With the help of this database, the appropriate operations of the operation device are determined according to a determination of the relations between the various instructions from the plurality of persons and jobs for which the instructions are received.

The priority database shown in FIG. 7 is effective when different instructions are provided for the same operation content. If, for example, the director D provides instructions that the zoom be changed to the telephoto side, whereas the producer P provides instructions that the zoom be changed to the wide-angle side, it is determined from the priority database shown in FIG. 7 that the instructions by the director D be prioritized. However, if the instructions by the director D are different from those by the producer P regarding the focus, it is determined from the priority database shown in FIG. 7 that the instructions by the producer P be prioritized.

Figure 8:
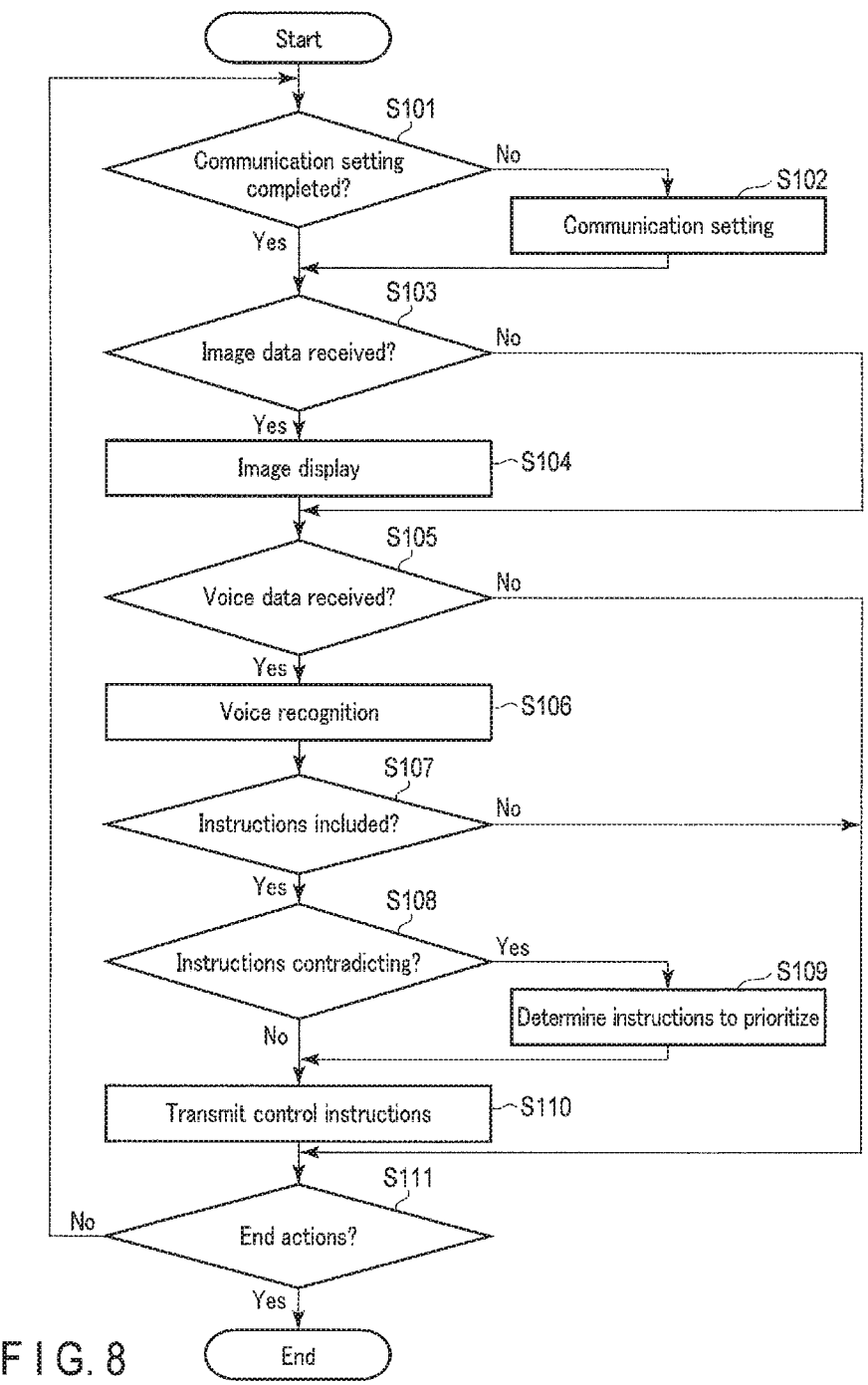
FIG. 8 is a flowchart showing the actions by the device control apparatus according to the first embodiment.
Figure 9:
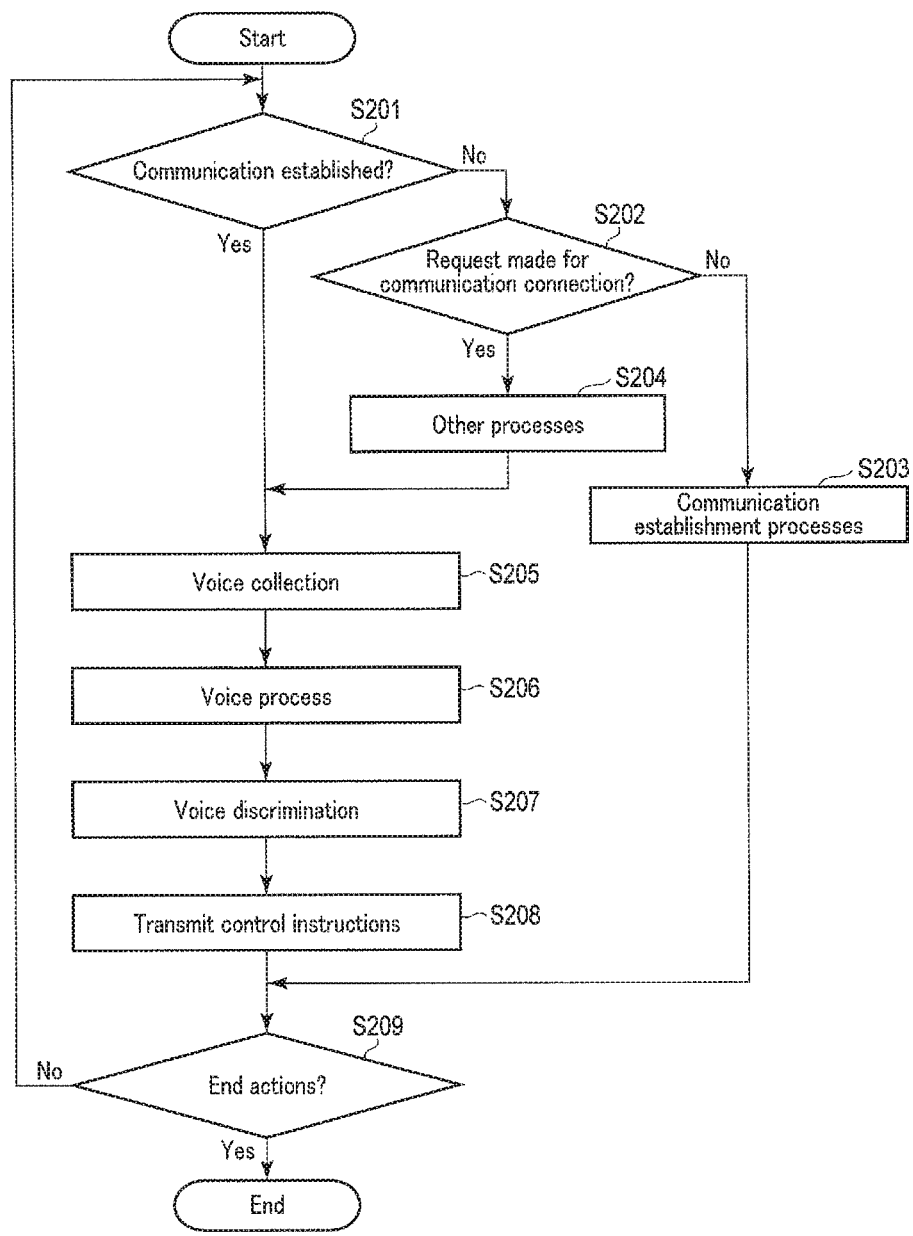
FIG. 9 shows a flowchart showing the actions by the voice collecting device.
Figure 10:
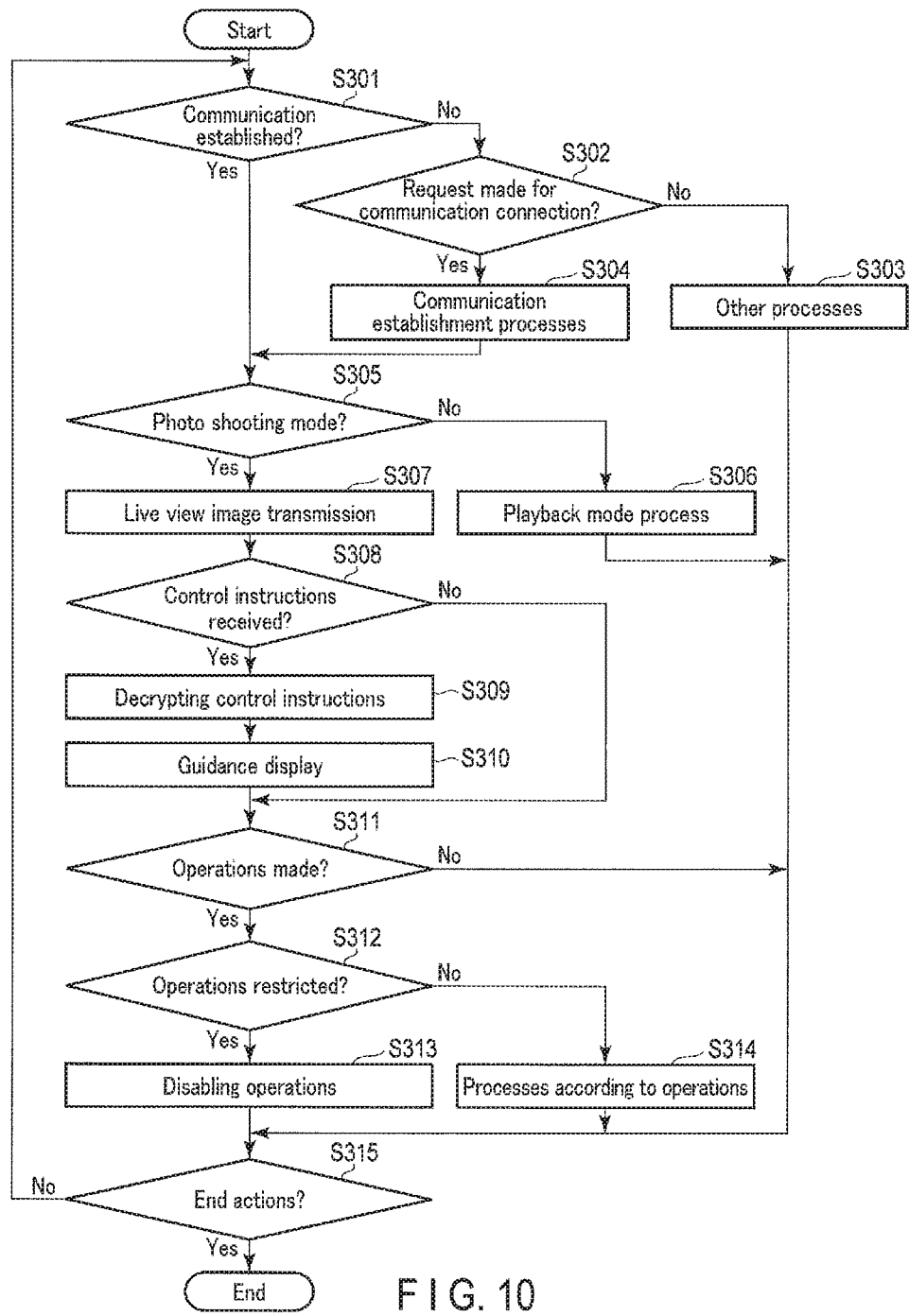
FIG. 10 shows a flowchart showing the actions by the operation device according to the first embodiment.

FIGS. 8, 9, 10 are flowcharts showing the actions by the device control system 1. FIG. 8 shows the actions by the device control apparatus 100. FIG. 9 shows the actions by the voice collecting device 200. FIG. 10 shows the actions by the operation device 300.

First, the actions by the device control apparatus 100 shall be described with reference to FIG. 8. Note that the actions shown in FIG. 8 are mainly controlled by the control circuit 102. It shall be assumed that the priority database shown in FIG. 6 or FIG. 7 has been established prior to the actions shown in FIG. 8.

In step S101, the control circuit 102 determined whether or not communication setting has been completed. In step S101, it is determined whether or not a communication connection with the voice collecting device 200 and the operation device 300 that are the communication counterparts of the device control apparatus 100 has been established. If it is determined in step S101 that communication setting has not been completed, the procedure continues to step S102. If it is determined in step S101 that communication setting has been completed, the procedure continues to step S103.

In step S102, the control circuit 102 performs the communication setting process. Namely, the control circuit 102 requests communication connections to be established with both the voice collecting device 200 and the operation device 300 located nearby. When communication connection has been established with both devices, the procedure continues to step S103.

In step S103, the control circuit 102 determines whether or not image data for live view from the operation device 300 has been received. If it is determined in step S103 that image data from the operation device 300 has not been received, the procedure continues to step S105. If it is determined in step S103 that image data from the operation device 300 has been received, the procedure continues to step S104. Note that image data is communicated via the first communication circuit 110*a*.

In step S104, the control circuit 102 displays the images based on the image data transmitted from the operation device 300 at, for example, the display 106. The producer P and the director D can view the images displayed at the display 106, and then confirm the images to take by the digital camera being the operation device 300. Based on the results of this confirmation, the producer P and the director D provide their voice instructions, as necessary.

In step S105, the control circuit 102 determines whether or not voice data from the voice collecting device 200 has been received. If it is determined in step S105 that voice data has not been received from the voice collecting device 200, the procedure continues to step S111. If it is determined in step S105 that voice data has been received from the voice collecting device 200, the procedure continues to step S106. Note that communication of the voice data is performed via the first communication circuit 110*a*.

In step S106, the control circuit 102 recognizes contents of the voice data with reference to the voice database of database 104*a*. If the voice data contains voices of a plurality of speakers, the control circuit 102 recognizes voice contents for each speaker. Upon completion of the voice recognition, the procedure continues to step S107.

In step S107, the control circuit 102 determines whether or not the recognized contents include instructions regarding operations of the operation device 300. If it is determined in step S107 that the recognized contents do not include instructions regarding operations of the operation device 300, the procedure continues to step S111. If it is determined in step S107 that the recognized contents include instructions regarding operations of the operation device 300, the procedure continues to step S108.

In step S108, the control circuit 102 determines whether or not the instructions contradict one another. When the producer P in the example of FIG. 5 is providing instructions that the focus be changed while the director D is providing instructions that the zoom be changed, it is determined that instructions are contradicting one another. However, when there is only one person providing instructions, or the instructions are identical, it is determined that instructions are not contradicting one another. If it is determined in step S108 that instructions are contradicting one another, the procedure continues to step S109. If it is determined in step S108 that instructions are not contradicting one another, the procedure continues to step S110.

In step S109, the control circuit 102 determines which of the contradicting instructions to prioritize according to priorities stored in the priority database of database 104*a*. Subsequently, the procedure continues to step S110. Note that the priority database shown in FIG. 6 and the priority database shown in FIG. 7 may be used separately or combined.

In step S110, the control circuit 102 generates control instructions for controlling the operation device 300 according to instruction contents. The control circuit 102 then transmits these generated control instructions to the operation device 300 via the communication circuit 110. Subsequently, the procedure continues to step S111. Note that control instructions are communicated via the second communication circuit 110b. The reason for this is that the data volume of the control instructions is smaller than the volume of the image data and the volume of the voice data. Communicating the control instructions using the second communication circuit 110b helps save power.

In step S111, the control circuit 102 determines whether or not actions by the device control apparatus 100 should be ended. If, for example, the power switch of the unit 108 is switched off, it is determined that actions by the device control apparatus 100 should be ended. If it is determined in step S111 that actions by the device control apparatus 100 should not be ended, the procedure continues to step S101. If it is determined in step S111 that actions by the device control apparatus 100 should be ended, the procedure shown in FIG. 8 is terminated. Note that when communications to the device control apparatus 100, the voice collecting device 200, and the operation device 300 are established, and actions by the device control apparatus 100 have been ended, control instructions to end actions by both the voice collecting device 200 and the operation device 300 are transmitted to both the voice collecting device 200 and the operation device 300.

Next, the actions by the voice collecting device 200 shall be described with reference to FIG. 9. The actions shown in FIG. 9 are mainly controlled by the control circuit 202.

In step S201, the control circuit 202 determines whether or not communication with the device control apparatus 100 has been established. If it is determined in step S201 that communication with the device control apparatus 100 has not been established, the procedure continues to step S202. If it is determined in step S201 that communication with the device control apparatus 100 has been established, the procedure continues to step S205.

In step S202, the control circuit 202 determines whether or not there has been a request from the device control apparatus 100 for communication connection. If it is determined in step S202 that there has not been a request from the device control apparatus 100 for communication connection, the procedure continues to step S203. If it is determined in step S202 that there has been a request from the device control apparatus 100 for communication connection, the procedure continues to step S204.

In step S203, the control circuit 202 performs processes other than those as device control system 1 of the voice collecting device 200. These other processes include, for example, storing the voices from the voice inputs as voice data in the storage medium 206. A more detailed explanation of these other processes shall be omitted. Subsequent to these other processes, the procedure continues to step S209.

In step S204, the control circuit 202 performs the process to establish communication with the device control apparatus 100. Subsequently, the procedure continues to step S205.

In step S205, the control circuit 202 causes the voice collector 204 to perform voice collection. In step S206, the control circuit 202 causes the voice processor 202a to perform voice processes such as noise elimination of the voice data obtained via the voice collector 204. In step S207, the control circuit 202 discriminates the voice data for each speaker by cross-checking, at the voice discriminator 202b, the voice data processed by the voice processor 202a against the database 206b stored in the storage medium 206. Discriminating the voice data for each speaker at the voice collecting device 200 renders voice discrimination at the device control apparatus 100 unnecessary and alleviates the burden at the device control apparatus 100. Of course, the discrimination of the voice data may also be performed at the device control apparatus 100.

In step S208, the control circuit 202 transmits the voice data discriminated for each speaker to the device control apparatus 100 via the first communication circuit 210. Subsequently, the procedure continues to step S209.

In step S209, the control circuit 202 determines whether or not to end actions by the voice collecting device 200. If, for example, the power switch of the unit 208 is switched off or control instructions have been received that operations be ended, it is determined that actions by the voice collecting device 200 be ended. If it is determined in step S209 that actions by the voice collecting device 200 should not be ended, the procedure continues to step S201. If it is determined in step S209 that actions by the voice collecting device 200 should be ended, the procedure shown in FIG. 9 is terminated.

Next, the actions by the operation device 300 shall be described with reference to FIG. 10. The actions shown in FIG. 10 are mainly controlled by the control circuit 302.

In step S301, the control circuit 302 determines whether or not communication with the device control apparatus 100 has been established. If it is determined in step S301 that communication with the device control apparatus 100 has not been established, the procedure continues to step S302. If it is determined in step S301 that communication with the device control apparatus 100 has been established, the procedure continues to step S305.

In step S302, the control circuit 302 determines whether or not there has been a request from the device control apparatus 100 for communication connection. If it is determined in step S302 that there has not been a request from the device control apparatus 100 for communication connection, the procedure continues to step S303. If it is determined in step S302 that there has been a request from the device control apparatus 100 for communication connection, the procedure continues to step S304.

In step S303, the control circuit 302 performs processes other than those as device control system 1 of the operation device 300. These other processes include, for example, image taking actions by the imaging unit 304 subsequent to image taking operations by the operator, and then storing image data 308a to the storage medium 206. A more detailed explanation of these other processes shall be omitted. Subsequent to these other processes, the procedure continues to step S315.

In step S304, the control circuit 302 performs the process to establish communication with the device control apparatus 100. Subsequently, the procedure continues to step S305.

In step S305, the control circuit 302 determines whether or not the current mode of operation is the shooting mode. The digital camera being the operation device 300 includes a shooting mode and a playback mode as modes of operation. The shooting mode is the mode of operation for recording the image data. The playback mode is the mode of operation for the playback of the image data. If it is determined in step S305 that the current mode of operation is not the shooting mode, the procedure continues to step S306. If it is determined in step S305 that the current mode of operation is the shooting mode, the procedure continues to step S307.

In step S306, the control circuit 302 performs the processes for playback mode. These processes for playback mode include causing the images based on image data selected by the user to be displayed at the display 306, and transmitting the same to an external device. A more detailed explanation of the playback mode processes shall be omitted. Subsequent to the playback mode processes, the procedure continues to step S315.

In step S307, the control circuit 302 transmits the image data for the live view to the device control apparatus 100. For this purpose, the control circuit 302 causes the imaging unit 304 to start taking images repeatedly. The control circuit 302 then performs the image process for the live view unto the image data successively obtained by the imaging unit 304. Subsequently, the control circuit 302 transmits the image data for the live view to the device control apparatus 100 via the first communication circuit 312a. Subsequently, the procedure continues to step S308.

In step S308, the control circuit 302 determines whether or not control instructions have been received from the device control apparatus 100. If it is determined in step S308 that control instructions have been received from the device control apparatus 100, the procedure continues to step S309. If it is determined in step S308 that control instructions have not been received, the procedure continues to step S311.

In step S309, the control circuit 302 decrypts contents of received control instructions. In step S310, the control circuit 302 causes guidance to be displayed at the display 306 according to decrypted contents of the control instructions. Subsequently, the procedure continues to step S311. If the control instruction is related to, for example, the zoom, the control circuit 302 causes a message to be displayed at the display 306 stating "more zoom, please!" Messages are selected by the control circuit 302 from, for example, messages corresponding to control instructions predicted at the operation device 300. However, messages may be generated each time that unpredicted control instructions are received. Note that guidance here is performed by a guidance display, but guidance may also be performed by lighting up corresponding operation elements, or per voice etc.

In step S311, the control circuit 302 determines whether or not there have been operations of the operation unit 310 by the operator. If it is determined in step S311 that there have been operations of the operation unit 310 by the operator, the procedure continues to step S312. If it is determined in step S311 that there have not been operations of the operation unit 310 by the operator, the procedure continues to step S315. Note that here what is being determined is whether or not operations have been performed. However, the control circuit 302 may also determine whether or not the operator contacted any specific operation elements. In this case, it is possible to disable operations before the operator performs operations.

In step S312, the control circuit 302 determines whether or not operation elements corresponding to those restricted by the person whose priority is higher than that of the operator have been operated. If, for example, the director D with the higher priority than the camera man C provides instructions restricting focus operations and the camera man C operates the operation elements relating to the focus, it is determined that operation elements corresponding to restricted operations have been operated. As another example, if the director D with the higher priority than the camera man C provides instructions that zoom operations be performed and the camera man C operates the operation elements relating to the focus, i.e. when contents of instructions by the director D contradict contents of operations by the camera man C, it is determined that operation elements corresponding to restricted operations have been operated. However, if control instructions have not been received, or contents of instructions by someone whose priority is higher than that of the camera man C are not contradicting contents of operations by the camera man C, or control instructions have been provided by someone whose priority is lower than that of the camera man C, it is determined that operation elements corresponding to restricted operations have not been operated. If it is determined in step S312 that operation elements corresponding to operations restricted by the person whose priority is higher than that of the operator have been operated, the procedure continues to step S313. If it is determined in step S312 that operation elements corresponding to operations restricted by the person whose priority is higher than that of the operator have not been operated, the procedure continues to step S314.

Note that contradiction here may, of course, also be broadened from such between an instruction and another instruction to such between an instruction and a response or such between an instruction and an operation. Notice further that the technique is not only applicable to contradictions between instructions and other instructions, but also to contradictions between instructions and responses. For this reason, it is also possible to provide an operation controller determining operations of the operation device according to consistency (degree of consistency) between instruction contents and response contents. In this case, a priority database or a relationship database is established for the speech background of each person, such as their strength of opinion, knowledge, experience, expertise, or their role in the specific scene to perform a control that effectively links speeches to operations in accordance with the given situation and help attain the object of the device or apparatus in the various situations. These may be determined in each scene or shot for each type and function of operated device using the database containing a result of classification of meanings or voice patterns included in speeches, commands etc. from instructions and responses used during the operations. By classifying into entirely different categories those speeches or commands that provide instructions for entirely different devices or functions, it is possible to compare them against each other to identify the category under which they fall and thereby easily determine whether there is a contradiction or consistency to the response. In addition to this classification for determination, a reference table may be consulted to determine whether or not there is a contradiction, a good consistency, or inconvenience between an instruction and another instruction. As it occurs that devices and functions are matched but the modalities of the operations are mismatched, a database may also be established in which good or bad consistency of relations between operations such as "focus" and "defocus", or of speeches and commands such as "focus slowly" and "focus fast" that indicate modalities of operations are tabulated. The devices can then refer thereto and determine consistency between instructions and responses. It is even possible to adopt a method by which to search a dictionary function and determine whether speeches and commands are synonyms or antonyms. From the viewpoint of "consistency", a method that uses such databases or learning for determination is effective, while from the viewpoint of "degree of consistency", it is advised to adopt a technique by which to standardize the differences in the way people speak (differences in qualities of male and female voice, accents, paraphrasing into different languages etc.) by replacing them with specific commands. Since there can be special or new, trendy ways how to speak in each of the different scenes, it is further effective to adopt a method by which similarities and contradictions are learned as necessary. In a broad sense, they can be a "consistency determination" and a "degree of consistency determination". Adding sensors detecting contradiction and consistency (degree of consistency) of operations during or before operations enables determining which elements of which devices were determined in which way, so that this can then be compared to the preceding instructions, commands, and responses. It is also possible to establish a database by which to conveniently search devices, operation elements, as well as speeds and directions of operations etc., or to determine consistency or discordance with the help of flowcharts.

In step S313, the control circuit 302 disables operations by the operator. Subsequently, the procedure continues to step S315. Notification that operations have been disabled may at this point be transmitted to the operator.

In step S314, the control circuit 302 performs the processes according to the operations by the operator. Subsequently, the procedure continues to step S315. If, for example, operations are zoom-related, the control circuit 302 controls the variable power lens drive circuit 304b to drive the zoom lens. If, for example, operations are related to image-taking operations, the control circuit 302 causes the imaging unit 304 to perform the image-taking operations and then stores the image data 308 to the storage medium 206.

Note that when it is determined in step S312 that operations have been performed by the operator, the processes of steps S312-S314 can also be performed at the device control apparatus 100 by notifying the device control apparatus 100 of the contents of operations by the operator. It is therefore also possible that the control circuit 302 stores information about which operation units of which devices have been operated in which manner to a storage unit, and detects this by a sensor, such as an encoder. Notification may even be performed by transmitting in real-time raw data obtained by the encoder, or by transmitting a summary signal of the raw data.

In step S315, the control circuit 302 determines whether or not to end actions by the operation device 300. If, for example, the power switch of the unit 310 is switched off or control instructions have been received to end actions, it is determined that actions by the operation device 300 be ended. If it is determined in step S315 that actions by the operation device 300 should not be ended, the procedure continues to step S301. If it is determined in step S315 that actions by the operation device 300 be ended, the procedure shown in FIG. 10 is terminated.

When, as described earlier in the embodiment, there is, besides the operator directly operating the operation device, another instructor engaged in actions by the operation device and contents of operations by the operator are contradicting contents of instructions by the instructor, the subsequent process contents are determined according to priorities that take the expertise, standpoint etc. of the operator and the instructor into account. Similarly, if there is a plurality of instructors, the subsequent process contents are determined according to the priorities between the instructors. In this manner, operations of the operation device in the embodiment are performed appropriately and reflect the opinions of those having the greatest expertise etc.

The following describes an example in which the device control system 1 is applied to the model shooting scene of the first embodiment. Previously, the "operations" given as example were zoom and focus operations of the digital camera being the operation device 300. However, in the field of photo shootings, it can happen that images of a plurality of photo shooting subjects are being taken, in which case instructions are received as to which of the photo shooting subjects to take images of. In this case, the camera man C moves the digital camera being the operation device 30 to fit the instructed photo shooting subjects into the composition. "Instructions for operations" according to the embodiment include instructions that operations of operation elements of the operation device 300 are unnecessary.

Second Embodiment

Next, the second embodiment of the present invention shall be described. Note that the configuration of the device control system may be that of the earlier described first embodiment. Thus, a more detailed explanation of the configuration of the device control system shall be omitted.

In the first embodiment, the processes were described when contents of operations by the operator contradict contents of instructions by the instructor, and contents of instructions by one instructor contradict contents of instructions by another instructor. To help convey the intention that underlies a person's speech, the speech, e.g. "response", is emphasized, here, for example in form of "repetition", to confirm that instructions are clear and understood. Now, both concepts may seem viable as both are speech usages helping convey the intention that underlies a person's speech. However, "repetition" has the benefit that, since the same speeches or contents are being repeated, job coordination between persons can be improved and accuracy can be increased by the abundancy in amount of voice information that is preferably made available to the system. Thanks to repetitions and the preceding voice instructions, it is further possible to determine accurately the relations between the instructions and the jobs, and even to take any advice from other persons into account. Thus, with this kind of relationship determination by which relations between different instructions by a plurality of persons and jobs for which they are received are determined, actions by the operation device are determined more accurately. In the previous model shooting example of the first embodiment, it is possible to confirm whether the camera man C understood the instructions by the director D or producer P correctly by letting him repeat the instructions. The second embodiment is an example in which operations of the operation device 300 by the operator are granted if the instructions by the instructor are repeated.

Figure 11:
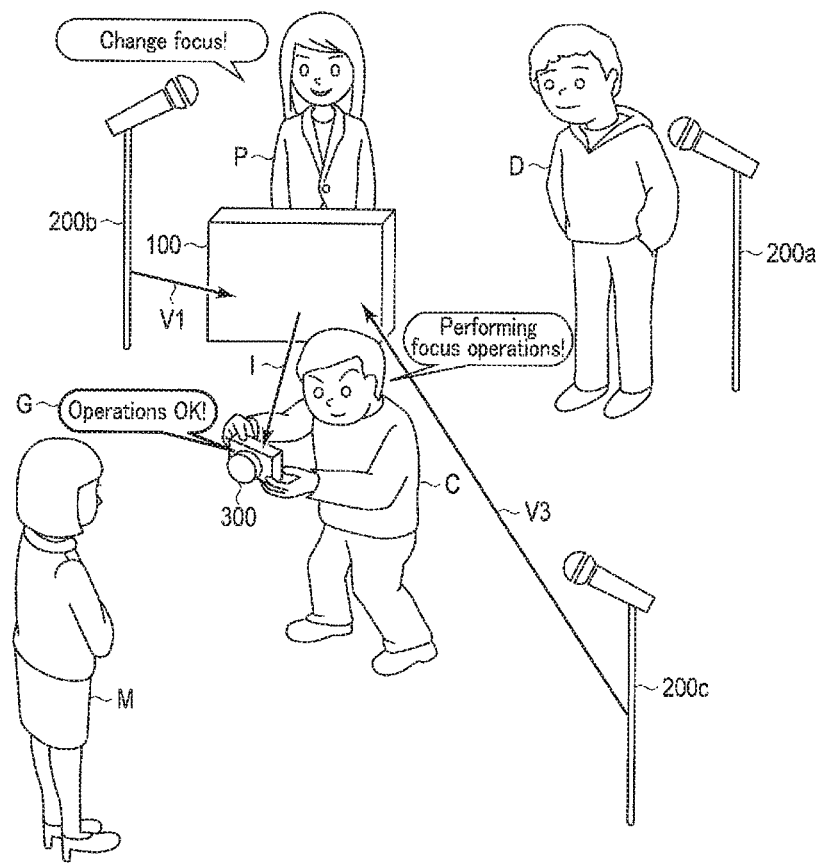
FIG. 11 shows a general outline of the actions by the device control system according to a second embodiment.

The following describes the actions by the device control system according to the embodiment. FIG. 11 a general outline of the actions by the device control system 1 according to the second embodiment. FIG. 11 is an example in which, similar to FIG. 5, the device control system 1 is used at a model shooting scene. In the example of FIG. 11, the voice collecting device 200c is provided near the camera man C who is the operator.

In the example of FIG. 11, the instructor, for an example producer P, provides instructions to the camera man C. In FIG. 11, the producer P provides instructions that the focus be changed. When instructed by the producer P that the focus be changed, the voice collecting device 200b collects, as shown in FIG. 11, the voice V1 containing the instructions. At the voice collecting device 200b, the voice data of the producer P is discriminated from the obtained voice data. This voice data is then transmitted to the device control apparatus 100.

The camera man C received the instructions by the producer P repeats the instructions by saying, for example, "will focus". The voice collecting device 200c then collects the voice V3. At the voice collecting device 200c, the voice data of the camera man C is discriminated from the obtained voice data. The voice data is then transmitted to the device control apparatus 100.

Following on from the voice data containing instructions by the producer P, the device control apparatus 100 determines whether or not voice data of the camera man C containing repetition of the instructions by the producer P has been received. If voice data of the camera man C containing repetition of the instructions by the producer P has been received, the device control apparatus 100 transmits control instructions I granting focus operations to the operation device 300. The camera man C can then operate the operation device 300 to change the focus. When focus operations are granted, but the camera man C intends to perform operations other than focus operations, for example, zoom operations, the zoom operations are disabled. In this manner, it is possible to operate the operation device 300 in the second embodiment, similar to the first embodiment, according to instructions by the person whose priority is highest considering expertise etc.

Figure 12:
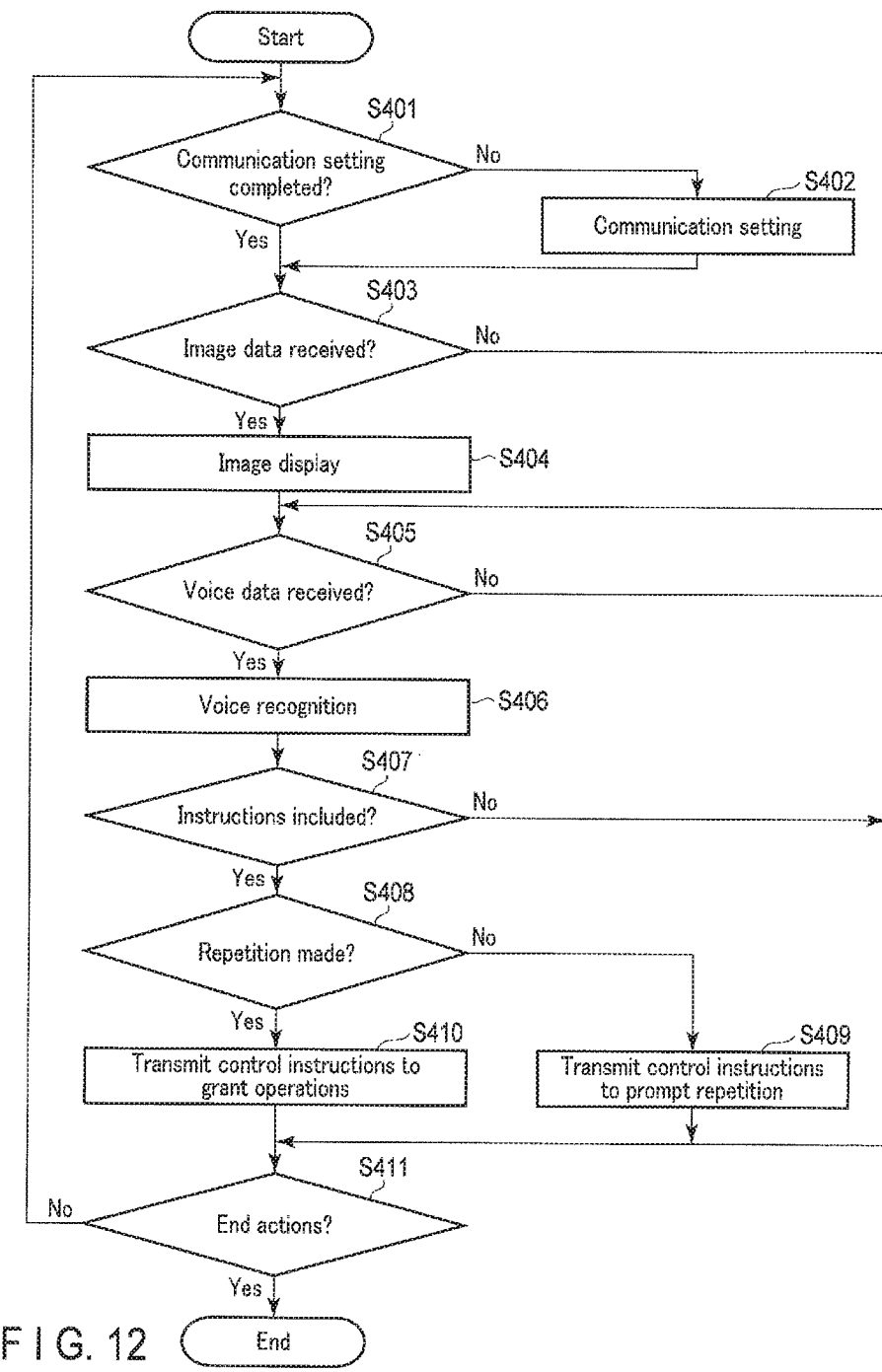
FIG. 12 shows a flowchart showing the actions by the device control apparatus according to the second embodiment.
Figure 13:
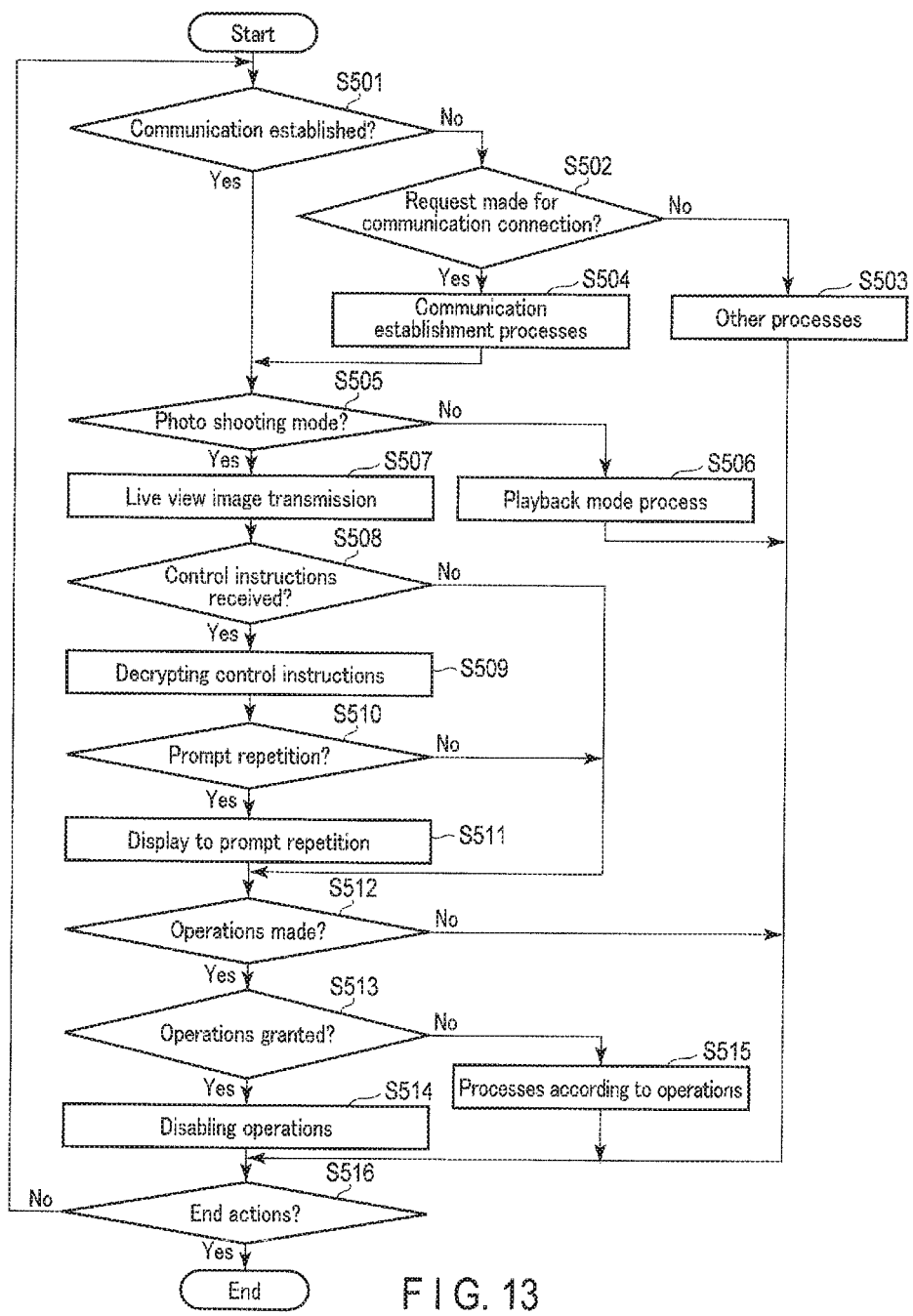
FIG. 13 shows a flowchart showing the actions by the operation device according to the second embodiment.

FIGS. 12, 13 are flowcharts showing the actions by the device control system 1. FIG. 12 is a flowchart showing the actions by the device control apparatus 100. FIG. 13 is a flowchart showing the actions by the operation device 300. The actions by the voice collecting device 200 are the same as those shown in FIG. 9, except that the voice of the operator is obtained as well. A more detailed explanation shall thus be omitted.

First, the actions by the device control apparatus 100 shall be described with reference to FIG. 12. The actions shown in FIG. 12 are mainly controlled by the control circuit 102. Note that further explanation of the actions show in FIG. 12 similar to those shown in FIG. 8 are either omitted or abbreviated.

The processes of steps S401-S406 of FIG. 12 are the same as steps S101-106 of FIG. 8. A more detailed explanation shall thus be omitted. In step S407, the control circuit 102 determines whether or not the recognized contents include instructions regarding operations of the operation device 300. If it is determined in step S407 that the recognized contents do not include instructions regarding operations of the operation device 300, the procedure continues to step S411. If it is determined in step S407 that the recognized contents include instructions regarding operations of the operation device 300, the procedure continues to step S408.

In step S408, the control circuit 102 determines whether or not the recognized contents include a repetition by the camera man C following instructions regarding operations of the operation device 300. This is to say that it is determined whether or not the voice of the camera man C following the operation instruction contents are indicative of the same contents as the operation instruction contents. Repetition is the fundamental action for confirming whether or not communication has been performed accurately. Besides the fundamental function of ascertaining whether or not the voice has been accurately heard, it is possible to convey to the others that the contents were correctly understood, creating a sense of ease and making it possible to share future jobs with the other members or staff, and making it possible to perform mutual checks that avoid mistakes. Another benefit is that determining voices provides time, thus creating enough time to spare for jobs. There may further be a repetition that clarifies specifics parts that want to be ascertained using segmentation or modification of expression, in which case the amount of information available for voice determination increases. Other methods can be adopted by which voices that are hardly heard are correctly re-determined by just repeating the contents. If the producer P in the example of FIG. 11 provides instructions that the focus be changed, and the camera man C speaks that the focus be changed, it is determined that a repetition is included. However, if the camera man C remains silent or contents of instructions by the producer P and contents of a repetition by the camera man C are inconsistent, it is determined that a repetition is not included. If it is determined in step S408 that a repetition is not included, the procedure continues to step S409. If it is determined in step S408 that a repetition is included, the procedure continues to step S410. By reflecting upon and taking into consideration for these branched determinations different approaches including repetition, it is possible to further increase accuracy of determination. Not only is accuracy of determination increased by reflecting upon and taking into consideration the different approaches including repetition, but also the workability as a whole is improved. In other words, determining the repetition by the person for the job handling the device (communication counterpart device) enables determining relations to the person who earlier provided instructions using similar speeches. The person who performed the preceding speech is the person providing instructions, whereas the person handling the device is the person performing the actual operations. In this manner, not only is the voice analyzed, but also temporal differences or whether or not communication between instructions and enforcements have been performed accurately can be ascertained, and utilizing the time between instructions and repetitions enables improving accuracy such as refinement when searching contents of instructions and making determinations. There may further be a repetition that clarifies specifics parts that want to be ascertained using segmentation or modification of expression, in which case the amount of information available for voice determination increases. These can thus be determined holistically. A method can be adopted by which voices that are hardly heard are correctly re-determined by another method, even if the contents are only repeated. By repetition, it is conveyed to the instructor whether or not the operator understood correctly. If there are other members present, repetition is also conveyed to them. Sometimes, when instructions and repetitions are inconsistent, the instructor or another member raises provides the voice comment that the repetition and the instructions are inconsistent. It is possible to determine at step S408, based on such voice whether or not there is a repetition. In this manner, appropriate actions by the operation device are determined according to a relationship determination by which the relations between different instructions by a plurality of persons and jobs for which they are received are determined.

Since repetition is so important, the control circuit 102 transmits in step S409 control instructions for prompting repetition to the operation device 300 via the communication circuit 110. Subsequently, the procedure continues to step S411. By adopting this repetition prompting technique, it is possible to improve job coordination accuracy. It is also possible to provide a mic or the like at the communication counterpart device to improve sound collecting characteristics. By combining this with controls such as directional control or with noise reduction, it is possible to further improve voice determination accuracy.

In step S410, the control circuit 102 generates, according to instruction contents, control instructions for granting operations of the operation device 300. The control circuit 102 then transmits the generated control instructions to the operation device 300 via the communication circuit 110. Subsequently, the procedure continues to step S411.

In step S411, the control circuit 102 determines whether or not to end actions by the device control apparatus 100. If it is determined in step S411 that actions by the device control apparatus 100 should not be ended, the procedure continues to step S401. If it is determined in step S411 that actions by the device control apparatus 100 should be ended, the procedure shown in FIG. 12 is ended. When, similar to FIG. 8, communication between the device control apparatus 100, the voice collecting device 200, and the operation device 300 is established and actions by the device control apparatus 100 are ended, control instructions for ending the actions by the voice collecting device 200 and the operation device 300 are transmitted to both the voice collecting device 200 and the operation device 300.

Next, the actions by the operation device 300 shall be described with reference to FIG. 13. The actions shown in FIG. 13 are mainly controlled by the control circuit 302. Note that further explanation of the actions shown in FIG. 13 similar to the ones shown in FIG. 10 are either omitted or abbreviated.

The processes of steps S501-S509 shown in FIG. 13 are the same as steps S301-S309 shown in FIG. 10. A more detailed explanation shall thus be omitted. In step S510, the control circuit 302 determines whether or not decrypted control instructions include control instructions for prompting repetition. Besides the fundamental function of ascertaining whether or not the voice has been accurately heard, it is possible to convey to the others that the contents were correctly understood, creating a sense of ease and making it possible to share future jobs with the other members or staff, and making it possible to perform mutual checks that avoid mistakes. Another benefit is that determining voices provides time, thus creating enough time to spare for jobs. Since there may further be a repetition that clarifies specifics parts that want to be ascertained using segmentation or modification of expression, information amount will increase at the time of determining voices. The situation can thus be determined and ascertained holistically as a system. Other methods can be adopted by which voices that are hardly heard are correctly re-determined by just repeating the contents. Accordingly, the actions by the device are also performed in an environment wherein accuracy is increased, so that misses do not occur. A mic for detecting repetitions may be installed into the device to improve accuracy of determining repetitions. Detecting the repetitions and communicating them also increases accuracy of determining who said what.

If it is determined in step S510 that decrypted control instructions include control instructions for prompting repetition, the procedure continues to step S511. If it is determined in step S510 that decrypted control instructions do not include control instructions for prompting repetition, the procedure continues to step S512.

In step S511, the control circuit 302 causes the display 306 to display a view for prompting repetition. Subsequently, the procedure continues to step S512. As an example, the control circuit 302 causes the display 306 to display a message reading "repeat producer instructions". The message is selected by the control circuit 302 from, for example, messages corresponding to control instructions predicted at the operation device 300. However, messages may be generated whenever unpredicted control instructions are received. Such view for prompting repetition reminds the operator of repeating the instructions by the instructor. Note that repetition here is prompted by display, but may also be prompted by voice or the like.

In step S512, the control circuit 302 determines whether or not there have been operations of the operation unit 310 by the operator. If it is determined in step S512 that there have been operations of the operation unit 310 by the operator, the procedure continues to step S513. If it is determined in step S512 that there have not been operations of the operation unit 310 by the operator, the procedure continues to step S516. Note here that what is determined is whether or not there have been operations, but it is also possible to determine whether or not the operator has contacted certain operation elements. By using a response such as a repetition, It is possible to determine whether responses by the plurality of persons relating to operations of the operation device.

In step S513, the control circuit 302 determines whether or not operations have been granted. If the decrypted control instructions include control instructions for granting certain operations, and operation elements operated by the operator relate to those operations, it is determined that the operations have been granted. If, for example, the producer P provides instructions that focus operations be performed and the instructions are met by a repetition by the camera man C that the focus operations be performed, the operation device 300 receives control instructions that the focus operations are granted. When the camera man C then operates the operation elements relating to the focus, it is determined that the operations are granted. Even when there are no instructions provided by the instructor, meaning that no control instructions are received, it is determined that the operations are granted. However, if there has been no repetition or the decrypted control instructions include control instructions that certain operations be granted but the operation elements operated by the operator do not relate to these operations, it is determined that the operations have not been granted. If, for example, the producer P provides the instruction that focus operations be performed and the instructions are met by a repetition by the camera man C that the focus operations be performed, but despite this, the camera man C performs operations other than these focus operations, it is determined that the operations have not been granted. If it is determined in step S513 that operations have been granted, the procedure continues to step S514. If it is determined in step S513 that operations have not been granted, the procedure continues to step S515.

In step S514, the control circuit 302 performs the processes according to the operations by the operator. Subsequently, the procedure continues to step S516. If, for example, operations relate to the focus, the control circuit 302 controls the focus lens drive circuit 304c to drive the focus lens. If, for another example, operations relate to taking images, the control circuit 302 causes image taking actions to be performed by the imaging unit 304, and then records the image data 308a to the storage medium 206.

In step S515, the control circuit 302 disables operations by the operator. Subsequently, the procedure continues to step S516. It may, at this point, be notified to the operator that the operations have been disabled.

Note that when it has been determined in step S512 that there have been operations by the operator, it is also possible to notify contents of the operations by the operator to the device control apparatus 100 to perform the processes of steps S512-S515 at the device control apparatus 100.

In step S516, the control circuit 302 determines whether or not to end actions by the operation device 300. If it is determined in step S516 that actions by the operation device 300 should not be ended, the procedure continues to step S501. If it is determined in step S516 that actions by the operation device 300 should be ended, the procedure shown in FIG. 13 is terminated.

As described above, actions by the operation device in the embodiment are granted according to repetitions by the operator directly operating the operation device.

Operations of the operation device in the embodiment are therefore performed appropriately and reflect the opinions of those with the greatest expertise etc., similar to the first embodiment.

Actions by the device control system 1 according to the first embodiment may also be combined with actions by the device control system 1 according to the second embodiment. An embodiment for this may be, for example, one in which, when there are instructions by a plurality of instructors competing against each other and it is determined based on the priority database of the first embodiment which instructions to be preferred and the determined instructions to be preferred are repeated, a control signal for granting the actions by the operation device 300 is transmitted.

Third Embodiment

Next, the third embodiment of the present invention shall be described. Note that the configuration of the device control system may basically be the same as for the aforementioned first embodiment. A more detailed explanation of the device control system configuration shall thus be omitted.

Figures 14, 15:
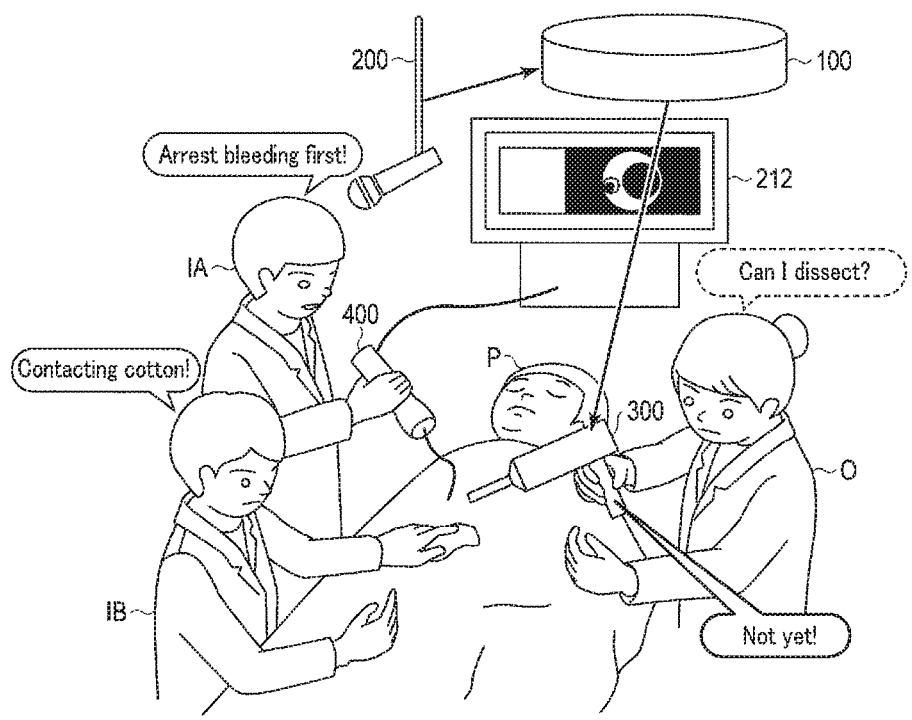
FIG. 14 shows a general outline of the actions by the device control system according to a third embodiment.
FIG. 15 shows an example priority database according to the third embodiment.

The first and second embodiments above were examples in which the device control system 1 was used at a model shooting scene. The third embodiment, however, is an example in which the device control system 1 is used during a surgery. FIG. 14 is a general outline of the actions by the device control system 1 according to the third embodiment. In the example of FIG. 14, the surgeon O (operator) is treating the patient P by operating the operation unit 310 of a medical tool being the operation device 300. Besides, there is the anesthesiologist IA (instructor A) inserting a laparoscope 400 into the patient P. The images being taken by the laparoscope 400 are being displayed at the display 212 mounted to the voice collecting device 200. The anesthesiologist is monitoring the condition of the patient P by viewing the images displayed at the display 212. The nurse IB (instructor B) is assisting as necessary, for example by contacting a gauze (cotton) to the affected area. The comments by the surgeon, the anesthesiologist, and the nurse are collected, for example, by the voice collecting device 200 installed at the display 212. The voice data collected by the voice collecting device 200 is transmitted to the device control apparatus 100 provided in, for example, a server via network. A voice collecting device may also be installed into each of the apparatuses and devices 100, 300, 400.

Unlike the model shooting scene, the situations in the surgery scene shown in FIG. 14 can change momentarily. It is therefore desirable to assign instruction priorities according to the situation at the time the operation device 300 is being used, such as in an emergency situation. FIG. 15 shows an example priority database according to the third embodiment. In the priority database shown in FIG. 15, the names of the persons engaged in the actions by the operation device 300 are matched for each situation with the priorities assigned to the respective names. In the example of FIG. 14, the persons engaged in actions by the operation device 300 are the operator, the instructor A, and the instructor B. The names of the persons engaged in the actions by the operation device 300 may be IDs or the like. In other words, when the situation in the embodiment changes, the priority changes as well.

Note that priorities stored in the priority database shown in FIG. 15 may be set by forming consensus between the persons engaged in actions by the operation device 300. The priorities may also be fixed values for each situation, or may be variable, for example, increased the more the voice becomes tense or the more the voice becomes loud. The priorities according to the situation may even be combined with priorities according to expertise of the operations shown in FIG. 7.

The actions by the device control system 1 for which a priority database is used may be the ones of FIGS. 8, 9, 10 described earlier. As an example, in the example of FIG. 14, the surgeon is using a medical tool being the operation device 300 to remove an affected area from the patient P. Meanwhile, the anesthesiologist monitoring the images at the display 212 provides instructions that bleeding in the affected area be arrested as the bleeding is intense. Because it is preferable when the patient is bleeding that bleeding be arrested first before removal, the anesthetic instructor's priority is set higher than that of the surgeon. The instruction "arrest bleeding first!" by the anesthetic instructor is therefore prioritized, so that operations of the medical tool by the surgeon are restricted. For example, to determine what the current situation is, images taken by the laparoscope 400 are analyzed using the device control apparatus 100. In other words, if it is determined from the images that the bleeding in the affected area is intense, the situation is deemed one of bleeding, so that the device control apparatus 100 performs determination according to priorities for bleeding situations.

It has been established that, even in this embodiment where the situation is changing momentarily, operations of the operation device can be performed appropriately and reflect the opinions of those with the greatest expertise etc. as the priorities are adopted according to the situations.

The present invention has been explained based on the aforementioned embodiments. However, the present invention shall not be limited to the aforementioned embodiments, and various modifications or applications may be made without departing from the spirit or scope of the general inventive concept of the present invention. For example, the techniques in the embodiments may be applied to various systems in which a team comprised of a plurality of persons is engaged in actions by the operation device. The techniques in the embodiments may therefore also be applied to various fields other than the aforementioned fields of photo shooting and medical treatment.

In the presented embodiments, instructors provided voice instructions to the operator. However, instructions by instructors are actually not limited to voice instructions. It is also possible to provide instructions to operators by, for example, operating certain operation elements, or having messages or the like be displayed. The art presented in the embodiments may even be applied to cases in which instructions by instructors are provided by, for example, remotely operating the operation device. In this case, if, for example, there have been operations performed by the person whose priority is higher than that of the operator, those operations are enabled. Especially in a noisy environment, it is possible to make determinations using gestures, sign language, facial expressions, keyboard typing etc. which are commonly employed as communication means alternatives to voice.

The different operations shown in the operation flowcharts hereinbefore have been described using terms such as "first" and "next". However, it is not essential that the operations be performed in the orders described.

It is also possible to store the different processes according to the embodiments hereinbefore as programs executable by a computer being the control circuit 102. Besides this, it is possible to store these in the storage medium of an external storage device such as a magnetic disc, optical disc, semiconductor memory etc., from which to be distributed. The control circuit 102 can then read the program stored in the storage medium of the external storage device, and perform the aforementioned processes since the actions are controlled by the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device control apparatus controlling an operation device, a plurality of persons being engaged in operations of the operation device, the device control apparatus comprising:
    a control circuit configured to:
        1) obtain voice instructions or voice responses from the plurality of persons, the voice instructions or voice responses including modalities of operations of the operation device,
        2) classify the modalities included in the voice instructions or voice responses, and
        3) determine a preferential operation of the operation device according to consistency between a first modalities classified from the voice instructions or a second modalities classified from the voice responses and priorities predefined for each person of the plurality of persons,
    wherein the plurality of persons includes an operator indirectly operating the operation device and at least one instructor directly operating the operation device, and
    the control circuit is further configured to:
        disable operations of the operation device by the operator when operations of the operation device by the operator contradict contents of instructions by the instructor relating to operations of the operation device, and the instructor has a higher priority than the operator, and
        grant operations of the operation device by the operator when operations of the operation device by the operator do not contradict contents of instructions by the instructor relating to operations of the operation device, or the operator has a higher priority than the instructor.

2. The device control apparatus according to claim 1, wherein the control circuit is configured to:
    determine relations between instructions from the plurality of persons and jobs for which the instructions are received, and
    set the priorities according to a result of the determination of the relations.

3. The device control apparatus according to claim 1, wherein the control circuit is configured to set the priorities according to expertise or standpoints of each person of the plurality of persons.

4. The device control apparatus according to claim 1, further comprising a memory configured to store the priorities,
    wherein the priorities are predefined for each content of operations of the operation device for each person of the plurality of persons.

5. The device control apparatus according to claim 1, further comprising a memory configured to store the priorities,
    wherein the priorities are predefined for each person of the plurality of persons for each situation in which the operation device is used.

6. The device control apparatus according to claim 1,
    wherein the control circuit is configured to provide instructions to the operation device that guidance for instructions relating to operations of the operation device by the instructor be provided to the operator.

7. A device control apparatus controlling an operation device, a plurality of persons being engaged in operations of the operation device, the device control apparatus comprising:
    a control circuit configured to:
        1) obtain voice instructions or voice responses from the plurality of persons, the voice instructions or voice responses relating to operations of the operation device including modalities of operations of the operation device,
        2) classify the modalities included in the voice instructions or voice responses, and
        3) determine a preferential operation of the operation device according to consistency between a first modalities classified from the voice instructions or a second modalities classified from the voice responses and priorities predefined for each person of the plurality of persons,
    wherein the plurality of persons includes at least one instructor indirectly operating the operation device and an operator directly operating the operation device, and
    the control circuit is configured to determine that instructions by the instructor relating to operations of the operation device shall be instructions relating to the preferential operation of the operation device when there has been a repetition by the operator subsequent to voice instructions by the instructor relating to operations of the operation device.

8. A device control method for controlling an operation device, a plurality of persons being engaged in operations of the operation device, the device control method comprising:
    1) obtaining, at a control circuit, instructions or voice responses from the plurality of persons, the voice instructions for the voice responses relating to operations of the operation device including modalities of operations of the operation device,
    2) classify, at the control circuit, the modalities included in the voice instructions or voice responses, and
    3) determining, at the control circuit, a preferential operation of the operation device according to consistency between a first modalities classified from the voice instructions or a second modalities classified from the voice responses and priorities predefined for each person of the plurality of persons,
    wherein the plurality of persons includes at least one instructor indirectly operating the operation device and an operator directly operating the operation device, and
    the control circuit is configured to determine that instructions by the instructor relating to operations of the operation device shall be instructions relating to the preferential operation of the operation device when there has been a repetition by the operator subsequent to voice instructions by the instructor relating to operations of the operation device.

9. A device control method for controlling an operation device, a plurality of persons being engaged in operations of the operation device, the device control method comprising:
 1) obtaining, at a control circuit, instructions or voice responses from the plurality of persons, the voice instructions for the voice responses including modalities of operations of the operation device,
 2) classify, at the control circuit, the modalities included in the voice instructions or voice responses, and
 3) determining, at the control circuit, a preferential operation of the operation device according to consistency between a first modalities classified from the voice instructions or a second modalities classified from the voice responses and priorities predefined for each person of the plurality of persons, wherein the plurality of persons includes an operator indirectly operating the operation device and at least one instructor directly operating the operation device, and
 4) disabling operations of the operation device by the operator when operations of the operation device by the operator contradict contents of instructions by the instructor relating to operations of the operation device, and the instructor has a higher priority than the operator, and
 5) granting operations of the operation device by the operator when operations of the operation device by the operator do not contradict contents of instructions by the instructor relating to operations of the operation device, or the operator has a higher priority than the instructor.

* * * * *